United States Patent

[11] 3,588,720

[72] Inventor Frederick R. Fluhr
Oxon Hill, Md.

[21] Appl. No. 804,572
[22] Filed Mar. 5, 1969
[45] Patented June 28, 1971
[73] Assignee The United States of America as represented by the Secretary of the Navy

[54] LINEAR PHASE DEMODULATOR
1 Claim, 1 Drawing Fig.

[52] U.S. Cl. .......... 329/124, 325/329, 328/133, 329/50, 329/112
[51] Int. Cl. .......... H03d 3/18
[50] Field of Search .......... 329/112, 50, 124; 328/133, 134; 325/328, 329; 178/5.4 (S.D.); 331/22, 23

[56] References Cited

UNITED STATES PATENTS

| | | | |
|---|---|---|---|
| 2,997,577 | 8/1961 | Kaminski et al. | 329/50X |
| 3,035,231 | 5/1962 | Neelands et al. | 329/124 |
| 3,060,380 | 10/1962 | Howell et al. | 329/50(UX) |
| 3,101,448 | 8/1963 | Costas | 329/50 |
| 3,121,202 | 2/1964 | Gray | 329/124 |
| 3,297,946 | 1/1967 | Clay | 328/133X |

*Primary Examiner*—Alfred L. Brody
*Attorneys*—R. S. Sciascia, A. L. Branning and J. G. Murray

ABSTRACT: A phase demodulator including a dual channel quadrature phase modulator for modulating an incoming phase modulated signal, a filter in each channel, a frequency mixer for combining the processed signals from the two channels, a frequency discriminator, and an integrator. The circuit doubles the phase argument of the input signal prior to demodulation so that the resolution of the phase information can be increased, and the accuracy enhanced.

Patented June 28, 1971 3,588,720
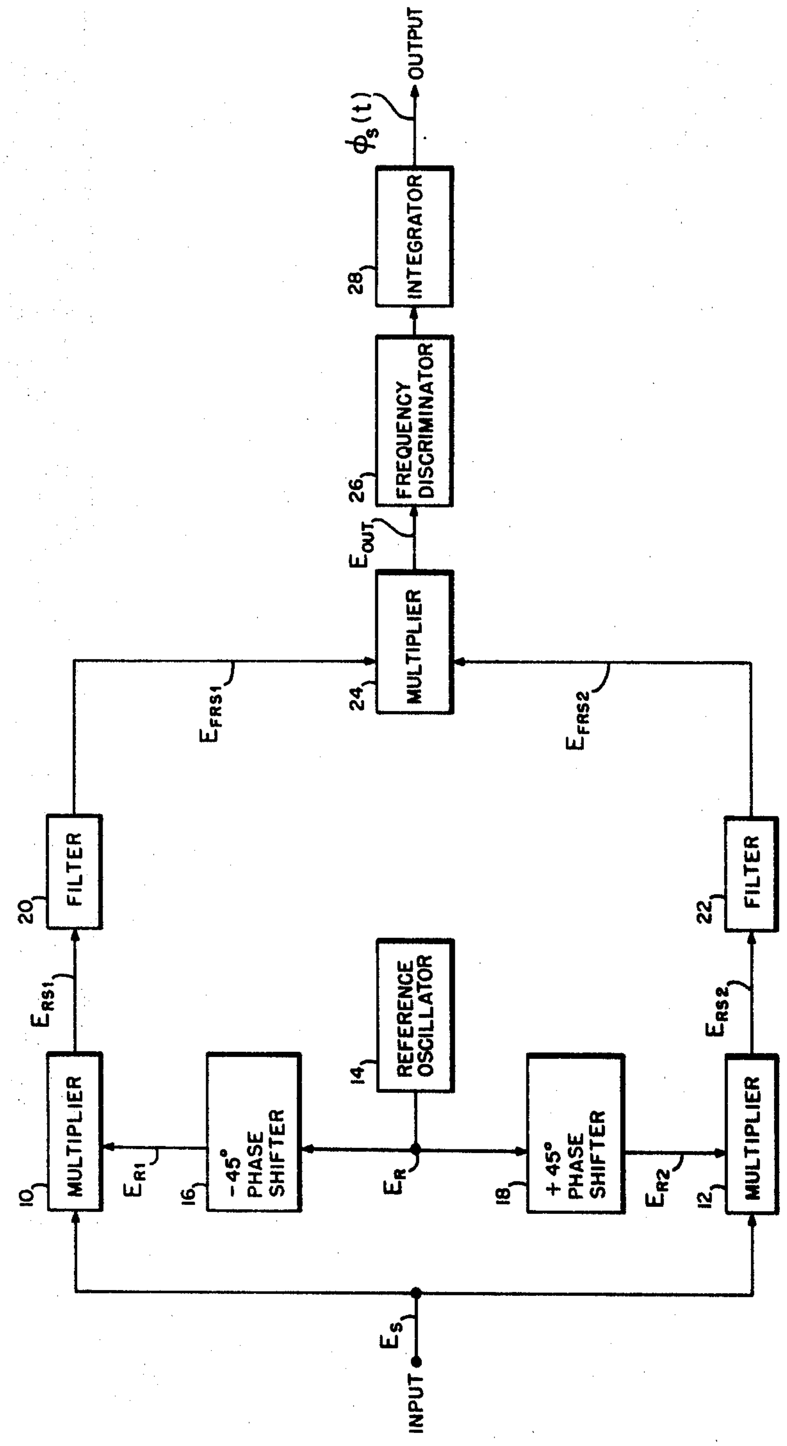
INVENTOR
FREDERICK R. FLUHR
BY
ATTORNEY

LINEAR PHASE DEMODULATOR

STATEMENT OF GOVERNMENT INTEREST

The invention described herein may be manufactured and used by or for the Government of the United States of America for governmental purposes without the payment of any royalties thereon or therefor

BACKGROUND OF THE INVENTION

The present invention relates to phase demodulators and, more particularly, to an improved phase demodulator capable of extracting information from a laser beam, wherein the incoming signal is quadrature phase shifted prior to final demodulation to thereby increase the resolution of the desired information.

The use of phase modulation in high frequency information systems has been increasing recently and has led researchers to investigate better ways in which to provide linear phase demodulation. This becomes an even more important consideration when attention is focused upon the many diverse applications presently being made with laser systems. Such systems operate at high frequencies and often require accurate phase demodulation techniques to effectuate the desired results. One system presently under investigation is a laser system for accurately tracking, profiling and characterizing surface turbulence of a body of water. Since small changes in surface turbulence may be quite relevant in many military, commercial, and experimental investigations, a high resolution phase demodulator necessarily must be employed.

In the past, high frequency phase demodulators having linear operation, and resulting high accuracy, have required complex circuitry, critical adjustment during manufacture, and are prohibitively expensive.

OBJECTS OF THE INVENTION

It is therefore one object of the present invention to provide a phase demodulator having all the advantages of similarly employed prior art devices and further providing linear operation at high frequencies.

This invention has a further object in the provision of a high frequency linear phase demodulator particularly adapted for use in a laser system.

Another object is the provision of a simple yet reliable phase demodulator capable of high data resolution.

A still further object of the present invention is to provide a phase demodulator which doubles the phase argument prior to demodulation for higher information resolution with enhanced accuracy.

Yet another object is the provision of a demodulator which translates the frequency of an incoming subcarrier to a lower value for easier linear processing.

SUMMARY OF THE INVENTION

The invention is summarized in that a circuit for demodulating a phase modulated input signal comprises a heterodyning device adapted to receive the phase modulated input signal for producing at least a first and a second frequency shifted output signal, which signals are in phase quadrature with each other. A multiplier is coupled to the heterodyning device for multiplying the first output signal with the second output signal, and a phase demodulator is coupled to the multiplier to provide the desired phase information signal.

One advantage of the present invention is the provision of a high frequency phase demodulator having substantially linear operating characteristics.

Other objects and advantages of the present invention will become more fully apparent from the following description of the preferred embodiment of the invention when considered in conjunction with the accompanying drawing.

BRIEF DESCRIPTION OF THE DRAWING

The FIGURE shows a schematic circuit diagram, in block form, of the preferred embodiment of the invention.

DESCRIPTION OF THE PREFERRED EMBODIMENT

The FIGURE shows two frequency multiplier circuits 10 and 12 which are coupled together at their input sides to receive a phase modulated input signal. Multipliers 10 and 12 are further coupled to a reference oscillator 14 through a negative 45° phase shifter 16 and a positive 45° phase shifter 18, respectively. The output signals from multiplier circuits 10 and 12 are coupled through filters 20 and 22, respectively, to an additional multiplier circuit 24 which is, in turn, coupled to a frequency discriminator 26 and an integrator 28 to complete the circuit.

The operation of the circuit will now be explained. The phase modulated input signal which is fed to one input of both multipliers 10 and 12 can be represented as $E_s$ and is equal to: $E_s = e_s \cos(w_s t + \phi_s)$, where $e_s$ equals the peak amplitude of the incoming signal, $w_s$ equals the angular frequency thereof, and $\Phi_s$ is the desired information component and is a function of time.

In a similar manner, the signal produced by reference oscillator 14 can be represented as follows:

$E_R = e_r \cos w_r t$, where $e_r$ is the peak amplitude and $w_r$ is the angular frequency.

After passing through the negative phase shifter 16, the reference signal becomes:

$E_{r1} = (^e r/2) \cos (w_r t - \pi/4)$.

Similarly, the reference signal after passing through phase shifter 18 equals:

$E_{r2} = (^e r/2) \cos (w_r t + \pi/4)$.

The multiplier circuits 10 and 12 multiply the input signal $E_s$ with a respective one of the two quadrature phase related reference signals $E_{r1}$ and $E_{r2}$ to produce signals $E_{rs1}$ and $E_{rs2}$ according to the following formulas:

$$E_{rs1} = Ae_r e_{s/4} [\cos\{(w_r + w_s)t - \pi/4 + \phi_s\} + \cos\{(w_r - w_s)t - \pi'4 - \phi_s\}];$$

and $$E_{rs2} = Ae_r e_{s/4} [\cos\{(w_r + w_s)t + \pi/4 + \phi_s\} + \cos\{(w_r - w_s)t + \pi/4 - \phi_s\}],$$

where "$A$" is a constant.

These signals contain both upper and lower sideband components, in accordance with well-known signal theory, the upper components of which are filtered out by filter circuits 20 and 22. The two signals which are fed to the inputs of multiplier circuit 24 can thus be represented as: $E_{FRS1} = (ae_r e_s/4) \cos [(w_r - w_s) t - \pi/4 - \Phi_s]$; and $E_{FRS2} = (ae_r e_s/4)\cos\{(w_r - w_s)t + \pi/4 - \phi_s\}$, where $a$ is a constant.

After multiplication by circuit 24, the signal equals: $E_{OUT} = E_0 \cos[2(w_r - w_s)t - 2\phi_s]$, where $E_0 = \frac{1}{2}(ae_r e_s/4)^2$ and is essentially a constant, and $w_r > w_s$.

At this point it can readily be seen that the phase argument $\Phi_s$, which is the desired information carrying signal, has been doubled to thereby enable a higher degree of resolution and accuracy in the demodulation process. Furthermore, the frequency of the signal has been reduced by the heterodyning action of the preceeding circuits so that linear demodulation, and the resulting further accuracy of the information signal, can be effectuated.

Signal $E_{OUT}$ is a modification of the original received signal $E_s$ with the frequency lowered and the phase argument doubled. This lower frequency signal is fed to a frequency discriminator 26 and an integrator 28, where linear phase demodulation occurs to produce the phase argument information signal $\Phi_s(t)$ as the ultimate system output. It is noted that signal $E_{OUT}$ can be processed by a conventional phase demodulation circuit to produce the desired results.

Thus, there is provided an accurate linear phase demodulator particularly adapted for use with high frequency signals including light.

It should be understood, of course, that the foregoing disclosure relates to only a preferred embodiment of the invention and that numerous modifications or alterations may be made thereto in light of the above teachings. What is claimed and desired to be secured by Letters Patent of the United States is:

I claim:

1. A circuit for demodulating a phase modulated signal, comprising:

a signal oscillator;

a negative 45° phase shifter coupled to said oscillator;

a positive 45° phase shifter coupled to said oscillator;

a first multiplier circuit coupled to said phase modulated signal and said negative phase shifter;

a second multiplier circuit coupled to said phase modulated signal and said positive phase shifter;

filter circuits coupled to said multiplier circuits for removing upper components of output signals from said multiplier circuits;

multiplying means coupled to said filter means for multiplying the filter circuits outputs whereby said phase modulated signal's phase argument is doubled; and a frequency discriminator and integrator coupled to said multiplying means for linear phase demodulation of said phase modulated signal and supplying a phase information signal.